Oct. 21, 1924.

V. HEBERT

PERCOLATOR

Filed Oct. 11, 1923

1,512,761

INVENTOR
Victor Hebert
BY James J. Sheehy Co.
ATTORNEYS

Patented Oct. 21, 1924.

1,512,761

UNITED STATES PATENT OFFICE.

VICTOR HEBERT, OF NEW IBERIA, LOUISIANA.

PERCOLATOR.

Application filed October 11, 1923. Serial No. 668,004.

*To all whom it may concern:*

Be it known that I, VICTOR HEBERT, a citizen of the United States, residing at New Iberia, in the parish of Iberia and State of Louisiana, have invented new and useful Improvements in Percolators, of which the following is a specification.

My present invention pertains to water heater devices and it contemplates the provision of a device whereby drip coffee may be easily and readily made and this without the necessity of a person giving the device attention during the making of coffee. The invention further contemplates the heating of water and spraying of said heated water.

The invention in all of its details will be fully understood from the following description and claim when the same are read in connection with the drawings accompanying and forming part of this specification, in which—

Figure 1:
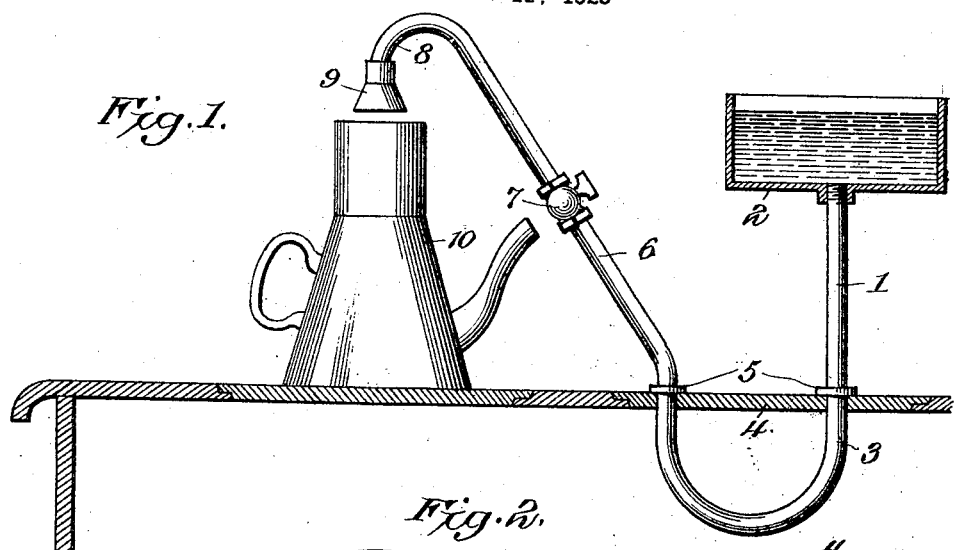
Figure 1 is a side elevation of the invention and showing its application to a range and coffee pot.
Figure 2:
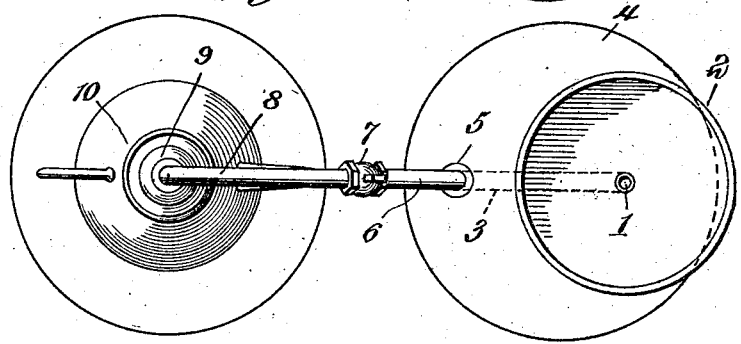
Figure 2 is a top plan view of Figure 1.

In Figures 1 and 2 similar numerals of reference designate corresponding parts in these views.

My invention comprises a tube 1 that is connected to a water container 2 that is preferably open at its upper end and the tube 1 is further provided with the curved portion 3 as illustrated and arranged on the tube and adapted to bear on the stove lid 4 are collars 5. It will be seen that the lid is provided with openings to receive the tubing and that when properly applied the curved portion 3 seats in the fire box of the range to which it is applied.

From the lid 4 the tube is bent at an angle as indicated by 6 and in said angular portion 1 provide a cut-off valve 7 while at its upper end the tube is provided with the goose neck 8 and on its extreme end the goose neck is provided a spray outlet 9.

In the practical use of the invention coffee is placed in a bag, screen container or otherwise, within the pot 10 that is properly positioned on the range. My novel device is then placed on the range as illustrated. Water will naturally fall into the curved portion 3 of the tube 1 and heating of said water in the fire box will cause the water to slowly rise in the angle tubing 6 to goose neck 8 and spray outlet 9.

Manifestly the water will drip very slowly into the pot 10 and hence liability of over cooking the coffee is precluded.

It will be apparent that no attention to the operation of the device is required.

Figure 3:
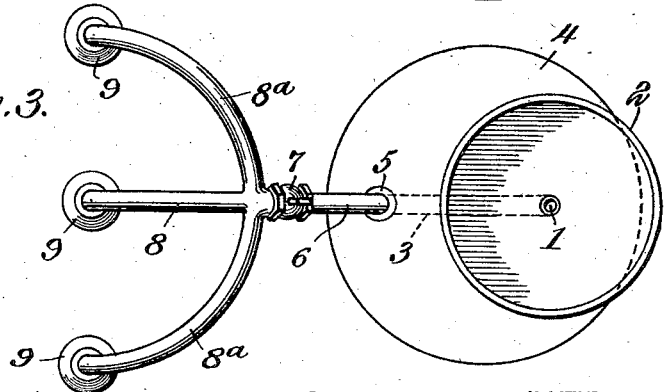
Figure 3 is a similar view and showing a series of drips or sprays arranged on the water pipe of the device. This is a modified form of construction.

In Figure 3 I show a device constructed similarly to that of Figures 1 and 2 except that the tubing 6 terminates in three goose necks 8 and 8$^a$ respectively and hence three pots of drip coffee may be brewed with this modified construction.

Manifestly the device is adapted for spraying heated water for use in bathing or for similar purposes.

Having described my invention, what I claim and desire to secure by Letters-Patent is:

In a device for brewing beverages, the combination with a coffee pot, a water container arranged adjacent the pot, open at its upper end and an outlet in its lower wall, a conduit connected to the outlet and having a portion thereof bent downwardly and then upwardly, collars arranged on the conduit extending at an angle from the bent portion and having a neck portion at the end of the angular portion, spray nozzles arranged on the extreme end of the angular portion, and a cut-off valve arranged in the angular portion of the conduit, substantially as and for the purpose specified.

In testimony whereof I have hereunto set my hand in presence of two subscribing witnesses:

VICTOR X HEBERT.
his mark

Witnesses:
A. W. FAUHOT,
M. FISHER.